(12) United States Patent
Imai et al.

(10) Patent No.: US 7,420,637 B2
(45) Date of Patent: Sep. 2, 2008

(54) SUBSTRATE WITH PARALLAX BARRIER LAYER, METHOD FOR PRODUCING SUBSTRATE WITH PARALLAX BARRIER LAYER, AND THREE-DIMENSIONAL DISPLAY

(75) Inventors: Akira Imai, Nara (JP); Akira Nakagawa, Matsubara (JP); Toshihiro Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 124 days.

(21) Appl. No.: 10/522,601

(22) PCT Filed: Jul. 16, 2003

(86) PCT No.: PCT/JP03/09054

§ 371 (c)(1),
(2), (4) Date: Jan. 26, 2005

(87) PCT Pub. No.: WO2004/011987

PCT Pub. Date: Feb. 5, 2004

(65) Prior Publication Data

US 2005/0243253 A1    Nov. 3, 2005

(30) Foreign Application Priority Data

Jul. 29, 2002    (JP)    ............................ 2002-220348

(51) Int. Cl.
*G02F 1/1333* (2006.01)
(52) U.S. Cl. ...................................... 349/122; 349/110
(58) Field of Classification Search .................. 349/122, 349/110
See application file for complete search history.

(56) References Cited

U.S. PATENT DOCUMENTS 5,969,850 A * 10/1999 Harrold et al. ............... 359/320

(Continued)

FOREIGN PATENT DOCUMENTS

JP    1-307703    12/1989

(Continued)

OTHER PUBLICATIONS

English translation of the International Preliminary Examination Report mailed Oct. 6, 2003 in corresponding PCT Application No. PCT/JP2003/009054.

(Continued)

*Primary Examiner*—David C. Nelms
*Assistant Examiner*—David Y Chung
(74) *Attorney, Agent, or Firm*—Nixon & Vanderhye P.C.

(57) ABSTRACT

The present invention provides a three-dimensional display device, which can display a 3D image of higher quality than a conventional one by arranging a parallax barrier layer with higher positioning accuracy, and a method for fabricating such a display device. The three-dimensional display device 100 includes a first substrate 11, which is provided closer to the viewer and which is made of a transparent material, a second substrate 21 arranged so as to face the first substrate 11, a liquid crystal layer 30 provided between the first substrate 11 and the second substrate 21, and a parallax barrier layer 12 provided on the surface of the first substrate so as to face the viewer. A polarizer 40 is further provided on the surface of the viewer-side substrate 10 that includes the parallax barrier layer 12 thereon.

10 Claims, 4 Drawing Sheets

U.S. PATENT DOCUMENTS

| | | | |
|---|---|---|---|
| 6,055,013 A | 4/2000 | Woodgate et al. | |
| 6,143,450 A * | 11/2000 | Sobue et al. | 430/7 |
| 6,437,915 B2 * | 8/2002 | Moseley et al. | 359/465 |
| 6,768,534 B2 * | 7/2004 | Iwase et al. | 349/153 |
| 7,058,252 B2 * | 6/2006 | Woodgate et al. | 385/16 |

FOREIGN PATENT DOCUMENTS

| | | |
|---|---|---|
| JP | 3-230699 | 10/1991 |
| JP | 08-163605 | 6/1996 |
| JP | 9-50019 | 2/1997 |
| JP | 11-95167 | 4/1999 |
| JP | 2000-39509 | 2/2000 |
| JP | 2000-98126 | 4/2000 |
| JP | 2001-075108 | 3/2001 |

OTHER PUBLICATIONS

International Search Report.

* cited by examiner

SUBSTRATE WITH PARALLAX BARRIER LAYER, METHOD FOR PRODUCING SUBSTRATE WITH PARALLAX BARRIER LAYER, AND THREE-DIMENSIONAL DISPLAY

This application is the US national phase of international application PCT/JP2003/009054 filed 16 Jul. 2003 which designated the U.S. and claims benefit of JP 2002-220348, dated 29 Jul. 2002, the entire content of which is hereby incorporated by reference.

TECHNICAL FIELD

The present invention relates to a substrate with a parallax barrier layer for use in a three-dimensional display device (i.e., 3D video display device), for example, a method for fabricating such a substrate, and a display device including such a parallax barrier layer.

BACKGROUND ART

A three-dimensional display device, in which a parallax barrier layer is provided for an LCD panel so as to face the viewer, is known in the art. For example, Japanese Patent Application Laid-Open Publication No. 11-95167 discloses a three-dimensional display device 200 as schematically shown in FIG. 4.

Figure 4:
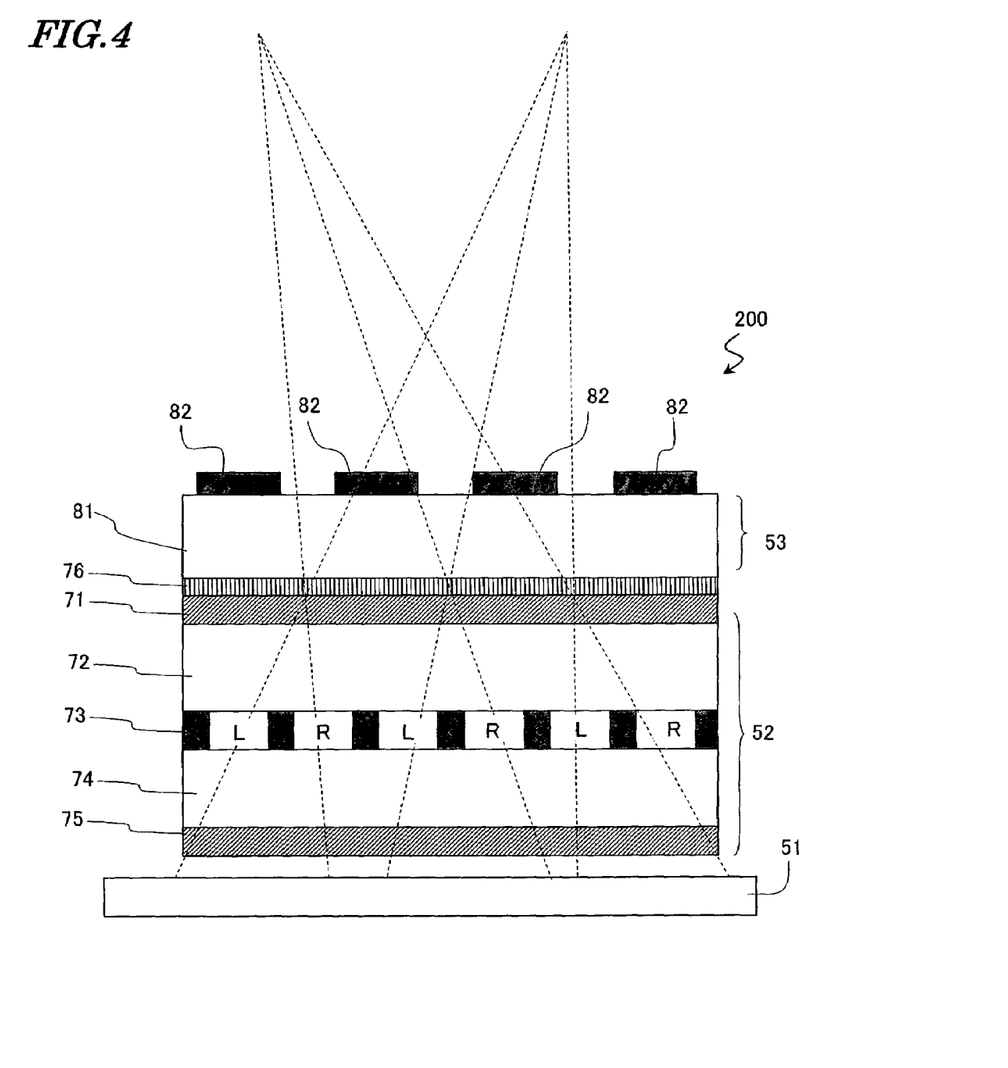
FIG. 4 is a cross-sectional view schematically illustrating a conventional three-dimensional display device 200.

The three-dimensional display device 200 shown in FIG. 4 includes an LCD panel 52 as a display panel and a substrate 53 with a parallax barrier layer (which will be referred to herein as a "parallax barrier substrate 53"), which is provided in contact with the surface of the LCD panel 52 so as to function as optical splitting means for splitting incoming light into right and left pictures. The parallax barrier substrate 53 is obtained by providing a parallax barrier layer 82, consisting of a lot of striped opaque portions, on a substrate 81 made of glass or a transparent resin, for example. The parallax barrier substrate 53 is arranged such that the surface of the substrate 81 thereof contacts with the surface of the LCD panel 52.

In the LCD panel 52, a liquid crystal layer 73 is sandwiched between two glass substrates 72 and 74, a light-outgoing-side polarizer 71 is provided on the glass substrate 72 that is located closer to the viewer (such a location will be referred to herein as "on the light outgoing side"), and a light-incoming-side polarizer 75 is provided on the glass substrate 74 that is located closer to a backlight 51 (such a location will be referred to herein as "on the light incoming side"). In the liquid crystal layer 73 of the LCD panel 52, right-eye and left-eye pictures are alternately arranged every other column. The right-eye picture, obtained by transmitting the light coming from the backlight 51, is split by the parallax barrier substrate 53. As a result, the viewer sees only the left-eye picture with his or her left eye and only the right-eye picture with his or her right eye, thereby sensing a three-dimensional picture.

In this three-dimensional display device 200, the surface of the polarizer 71 of the LCD panel 52 is covered with an antireflection coating 76 to minimize the reflection at the interface where the parallax barrier substrate 53 and the LCD panel 52 contact with each other. As a result, the amount of light reflected back from the interface through the LCD panel 52 can be reduced and therefore, interference fringes, which would otherwise be produced a lot due to an interference with the light reflected by the polarizer 71, can be cut down.

In every conventional three-dimensional display device including this three-dimensional display device 200 (see FIGS. 4 through 7 of the publication identified above), the parallax barrier substrate 53 is bonded as an external member to the LCD panel 52 including the polarizer 71. That is to say, between the parallax barrier layer 82 and pixels (i.e., liquid crystal layer 73), the viewer-side substrate 72 of the display panel, the polarizer 71, the antireflection coating 76 and the substrate 81 are stacked in this order as viewed upward from the liquid crystal layer 73. In addition, an adhesive layer (not shown) for bonding the parallax barrier substrate 81 is further provided.

For that reason, it is difficult to accurately control the distance between the parallax barrier layer 82 and the pixels or to make this distance uniform all over the display plane. Furthermore, it is also hard to position the parallax barrier layer 82 with respect to the pixels on the display plane with sufficiently high accuracy.

If the distance from the parallax barrier layer 82 to one pixel (of the liquid crystal layer 73) were different from the distance from that layer 82 to another pixel within the same plane, then interference fringes or moire fringes would be created or the display luminance might vary, thus possibly deteriorating the display quality.

Also, if the positioning accuracy were low within the display plane, then the pixel aperture ratio might decrease so much as to create moire fringes, too.

Furthermore, as there are a lot of interfaces between the liquid crystal layer 73 and the viewer, the display quality might be decreased seriously by a significant loss of the light due to reflection at those interfaces.

The higher the definition of display panels, the more critical these various problems are likely to get. Furthermore, particularly in a method of fabricating a display device in which a large scale panel is fabricated by performing a single flow of processing steps on the same big substrate and then divided into a number of smaller scale panels, if the parallax barrier substrate were bonded to the large scale panel, then those problems would arise easily to decrease the yield and productivity significantly. What is worse, once the parallax barrier substrate has been bonded, it is very difficult to cut the assembly into smaller pieces just as intended.

DISCLOSURE OF INVENTION

In order to overcome the problems described above, a primary object of the present invention is to provide a display-device, which can display an image of higher quality than a conventional one by arranging a parallax barrier layer with higher positioning accuracy, and a method for fabricating such a display device. The display device is used as a device for presenting mutually different pictures to viewpoints in two directions (e.g., a three-dimensional display device that can present a 3D image (3D image display device)). Another object of the present invention is to provide a substrate with a parallax barrier layer, which can be used effectively in such a display device, and a method for fabricating such a substrate.

A method for fabricating a substrate with a parallax barrier layer according to the present invention includes steps of: (a) preparing a first substrate, which has a first principal surface and a second principal surface that are opposed to each other and which is made of a transparent material; (b) providing a parallax barrier layer with a predetermined pattern on the first principal surface of the first substrate; and (c) forming a first layer, which satisfies a prescribed positional relationship with the parallax barrier layer, on the second principal surface of the first substrate, whereby the above objects are achieved.

In one preferred embodiment, the step (b) includes a step of making a first alignment mark.

In another preferred embodiment, the step (c) includes a step of locating the first alignment mark through the first substrate and achieving alignment with respect to the first alignment mark.

The first alignment mark is preferably made of the material of the parallax barrier layer.

The parallax barrier layer is preferably made of a metallic material.

The step (c) may include either a step of forming a color filter layer as the first layer or a step of forming a black matrix layer as the first layer. It is naturally possible that the step (c) includes a step of forming both a color filter layer and a black matrix layer. Alternatively, the step (c) may include step of forming any other component as the first layer.

The step (c) may further include a step of making a second alignment mark of the material of the first layer.

A method for fabricating a three-dimensional display device according to the present invention includes steps of: (A) preparing a substrate with a parallax barrier layer by one of the methods described above; (B) securing a second substrate to the substrate with the parallax barrier layer with a predetermined gap provided between the two substrates; and (C) forming a display medium layer between the substrate with the parallax barrier layer and the second substrate, whereby the above objects are achieved.

In one preferred embodiment, the method further includes a step of (D) dividing a panel, in which the substrate with the parallax barrier layer and the second substrate are combined with each other, into a number of smaller panels after one of the steps (B) and (C).

In another preferred embodiment, the display medium layer is a liquid crystal layer. In that case, the method may further include a step of arranging a polarizer on a viewer-side surface of the parallax barrier layer after the step (D).

A display device according to the present invention is characterized by being fabricated by one of the methods described above.

Another display device according to the present invention includes: a first substrate, which is arranged closer to a viewer and which is made of a transparent material; a second substrate opposed to the first substrate; a display medium layer interposed between the first and second substrates; and a parallax barrier layer provided on the surface of the first substrate so as to face the viewer.

Still another display device according to the present invention includes: a first substrate, which is arranged closer to a viewer and which is made of a transparent material; a second substrate opposed to the first substrate; a liquid crystal layer interposed between the first and second substrates; a polarizer located closer to the viewer than the first substrate is; and a parallax barrier layer provided between the first substrate and the polarizer.

BEST MODE FOR CARRYING OUT THE INVENTION

Hereinafter, structures of a display device and, a substrate with a parallax barrier layer and methods for fabricating them according to preferred embodiments of the present invention will be described with reference to the accompanying drawings.

A display device according to the present invention can present mutually different pictures to at least two viewpoints. As used herein, the "viewpoints" may belong to either a single person or a number of persons. In the former case, the "viewpoints" are the positions of the right and left eyes of that viewer. In the latter case, the "viewpoints" are the respective locations of those people.

When applied to a single viewer, a display device according to the present invention is implemented as a three-dimensional display device that can present a 3D image to him or her and may be used in a cell phone or a TV, for example. On the other hand, when applied to a number of viewers, another display device according to the present invention is implemented as a display device that can present mutually different pictures to them and may be used as a TV monitor or a display for presenting a picture of a car navigation system to the driver at the driver's seat of a car and a TV picture to the person at the passenger's seat. In this case, the "mutually different pictures" do not have to be associated with each other.

In the following preferred embodiments, a device for presenting a 3D picture using an LCD will be described as an example. However, the present invention is in no way limited to such a preferred embodiment using an LCD.

Figure 1:
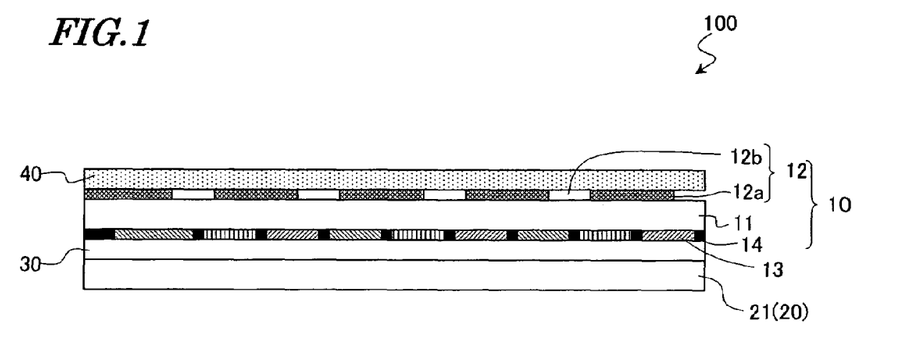
FIG. 1 is a cross-sectional view schematically illustrating a three-dimensional display device 100 according to a preferred embodiment of the present invention.
Figure 2:
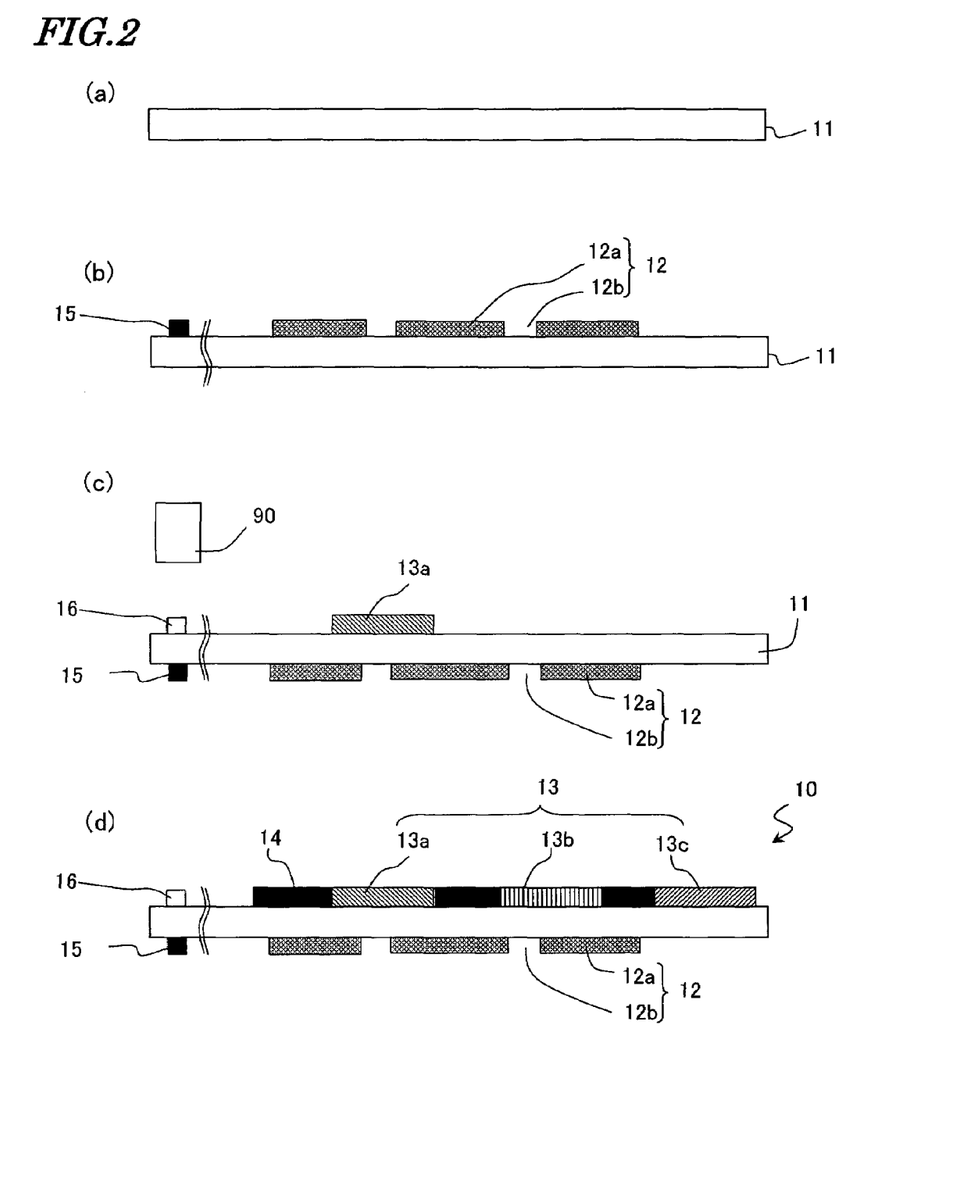
FIGS. 2(a) through 2(d) are cross-sectional views schematically illustrating a method for fabricating a counter substrate 10 with a parallax barrier layer according to a preferred embodiment of the present invention.

FIG. 1 schematically illustrates a cross-sectional structure of a three-dimensional display device 100 according to a preferred embodiment of the present invention.

The three-dimensional display device 100 includes a first substrate 11, which is arranged closer to the viewer and which is made of a transparent material, a second substrate 21 opposed to the first substrate 11, a liquid crystal layer 30 interposed between the first and second substrates 11 and 21, and a parallax barrier layer 12 provided on the surface of the first substrate so as to face the viewer.

A color filter layer 13 with a black matrix 14 is provided on the first substrate 11 so as to face the liquid crystal layer 30. If necessary, an electrode (e.g., a counter electrode, not shown) and/or an alignment film (not shown, either) may be additionally provided. The parallax barrier layer 12 includes opaque portions 12a and translucent portions 12b. The opaque and translucent portions 12a and 12b are arranged in a predetermined pattern and so as to correspond with the pixel arrangement such that a light ray that has been transmitted through a particular one of those pixels will eventually reach the viewer's right or left eye just as intended. The thickness of the first substrate 11 and the arrangement of the translucent portions 12b may be appropriately determined according to the size of the LCD panel and the (designed) viewing distance.

On the second substrate 21, pixel electrodes, TFTs, data lines and/or alignment film (none of which is shown in FIG. 1) may be provided if necessary so as to face the liquid crystal layer 30.

In this preferred embodiment, the first and second substrates 11 and 21 are typically made of a transparent material such as glass or plastic and may be covered with an inorganic protective coating as needed. However, neither the first substrate 11 nor the second substrate 21 includes electrodes, TFTs, data lines or any other circuit element or the color filter layer 13, black matrix 14, polarizer 40 or any other optical element contributing directly to the display operation. In a reflective display device, the second substrate 21 does not have to be transparent and may be a semiconductor substrate, for example.

In the following description, the assembly obtained by arranging the color filter layer 13, black matrix 14, electrodes and alignment film on the first substrate 11 will be referred to herein as a "counter substrate 10", and the assembly obtained by arranging the electrodes, TFTs, data lines and other circuit elements and the alignment film on the second substrate 21 will be referred to herein as a "TFT substrate 20". This preferred embodiment is an active-matrix-addressed display device including TFTs. However, the present invention is in no way limited to this specific preferred embodiment. Alternatively, the present invention is also applicable for use in an active-matrix-addressed display device including MIMs or a passive display device, too. In the assembling process step for a display device (to be described later), the counter substrate 10 and the TFT substrate 20 are bonded together as a pair of substrates.

Unlike the conventional three-dimensional display device in which the substrate 53 with a parallax barrier layer is attached afterward to the display panel 52 as already described with reference to FIG. 4, the parallax barrier layer 12 is provided directly on the principal surface of the first substrate 11 on the viewer side of the display panel in the three-dimensional display device 100 of this preferred embodiment. That is to say, in this three-dimensional display device 100, the parallax barrier layer 12 is located between the substrate 11 and the polarizer 40.

As described above, in the three-dimensional display device 100 of this preferred embodiment, neither the substrate 53 (see FIG. 4) nor the adhesive layer for bonding the substrate 53 as an external member is present between the parallax barrier layer 12 and the liquid crystal layer 30. Thus, there should be no variation in the distance between the parallax barrier layer 12 and the liquid crystal layer 30. In addition, since the number of interfaces present between the parallax barrier layer 12 and the liquid crystal layer 30 is smaller than in the conventional three-dimensional display device, the loss of the light due to reflection, for example, can be reduced.

Among other things, if the counter substrate 10 with the parallax barrier layer is fabricated by the method to be described below, then the parallax barrier layer 12 can be positioned with respect to the color filter layer 13 with the black matrix 14 much more accurately. In addition, by providing the parallax barrier layer 12 in advance for the first substrate 11 to make up an LCD panel, a manufacturing process in which a large scale panel is once fabricated and then divided into smaller fractions can be adopted. As a result, the manufacturing process can be simplified and can be carried out at a lower cost.

Hereinafter, a method for fabricating a counter substrate 10 with a parallax barrier layer according to a preferred embodiment of the present invention will be described with reference to FIGS. 2(a) through 2(d).

First, as shown in FIG. 2(a), a first substrate 11 of glass, for example, is prepared.

Next, as shown in FIG. 2(b), a parallax barrier layer 12 is formed on the principal surface of the first substrate 11. In the parallax barrier layer 12, opaque portions 12a and translucent portions 12b are arranged in a predetermined pattern. The parallax barrier layer 12 may be made of any arbitrary material as long as the material has some opacity. For example, a resin material or metallic material with some degree of opacity may be used. The method of forming the parallax barrier layer 12 is not particularly limited, either. Instead, any known method may be appropriately selected according to the material used. As an example, a metallic material (e.g., chromium) is preferably used because such a material is not subject to damage easily through a series of process steps for fabricating the counter substrate 10 and because a sufficient degree of opacity is guaranteed even with a relatively thin film.

In this process step, a first alignment mark 15 is preferably made for the purpose of alignment when a color filter layer 13 is provided after that. The first alignment mark 15 is preferably made of the material of the parallax barrier layer 12 and is preferably left during the process of forming the parallax barrier layer 12. The location of the first alignment mark 12 may be appropriately selected. However, the first alignment mark 15 is preferably located around an edge of the first substrate 11 so as not to overlap with the color filter layer 13 and so on to be provided later. It should be noted that if the alignment is carried out with the pattern of the parallax barrier layer 12, then the first alignment mark 15 may be omitted.

Next, as shown in FIG. 2(c), a color filter layer 13 is formed on the other principal surface (i.e., the back surface) of the first substrate 11, which is opposite to the principal surface on which the parallax barrier layer 12 has been provided. In the illustrated example, color filters in the three colors of R, G and B or C, M and Y, for example, are sequentially provided.

Specifically, first, on the back surface of the first substrate 11 on which the parallax barrier layer 12 has been provided, a first color layer 13a to make up the color filter layer 13 is defined in a predetermined pattern. In this process step, the first color layer 13a is positioned by getting the first alignment mark 15 detected by a CCD camera, for example, through the first substrate 11. This alignment may be done by using either transmitted light or reflected light. Also, the CCD method does not have to be adopted but any other method may be used, too.

If the first color layer 13a is defined by a photolithographic process, for example, then a first photosensitive resin layer to be the first color layer 13a is deposited almost over the entire back surface of the first substrate 11 so as not to overlap with the first alignment mark 15. Next, a photomask is aligned with respect to the first alignment mark 15, thereby exposing the first photosensitive resin layer to a radiation. Thereafter, development and other process steps are carried out to define the first color layer 13a.

In this process step of defining the first color layer 13a, a second alignment mark 16 is preferably made on the back surface of the first substrate 11. The second alignment mark 16 is preferably made of the material of the first color layer 13a and is preferably left during the process of forming the first color layer 13a. If the alignment is done by reference to the second alignment mark in each of the process steps of defining second and third color layers 13b and 13c after the first color layer 13a has been defined, then these three color layers 13a, 13b and 13c can be aligned with each other more accurately.

If the alignment were done by reference to the first alignment mark, for example, then the positioning accuracy would be within about 10 μm. Also, the patterning accuracy (i.e., the variation in the width) of the first color layer 13a would be within about 3 μm. Accordingly, an alignment margin of at most about 25 μm should be provided for the first and second color layers 13a and 13b. On the other hand, if the second alignment mark 16 is used, then an alignment accuracy of about 3 μm or less, which is equal to that of a conventional process of forming a color filter layer, is achieved. The location of the second alignment mark 16 is not particularly limited, either. However, the second alignment mark 16 is preferably provided so as not to overlap with any of second and third photosensitive resin layers to be the second and third color layers 13b and 13c, respectively, while these layers 13b and 13c are being defined.

Thereafter, the black matrix 14 is formed as shown in FIG. 2(d) and then a counter electrode and an alignment film (none of which is shown in FIG. 2(d)) are further provided if necessary, thereby obtaining a counter substrate 10. The counter substrate 10 of this preferred embodiment may be used as a color filter substrate (CF substrate) for a TFT LCD.

In the preferred embodiment described above, the color filter layer 13 (i.e., the first color layer 13a) is formed first on the back surface of the first substrate 11 as a layer that satisfies a prescribed positional relationship with the parallax barrier layer 12. Alternatively, the black matrix 14 or any other layer may be provided there first. It is naturally possible to omit either the color filter layer 13 or the black matrix 14. In any case, the second alignment mark is preferably made during the process step of forming the first layer that needs alignment.

According to the present invention, the counter substrate 10 has the parallax barrier layer 12. Accordingly, a lot of display devices can be made efficiently from a single large scale panel by adopting the process shown in FIG. 3. The process of mass-producing display devices from a single large scale panel is adopted extensively today and may be carried out by a known method. Thus, the detailed description thereof will be omitted herein.

First, in Step S1a, a large scale CF substrate 10 with a parallax barrier layer 12 is prepared. The CF substrate 10 has preferably been fabricated by performing the process steps that have been described with reference to FIG. 2 on a large scale glass substrate as the first substrate 11. Meanwhile, in Step S1b, a large scale TFT substrate 20 is also prepared. The large scale TFT substrate 20 is also fabricated by a known method and the description thereof will be omitted herein.

Figure 3:
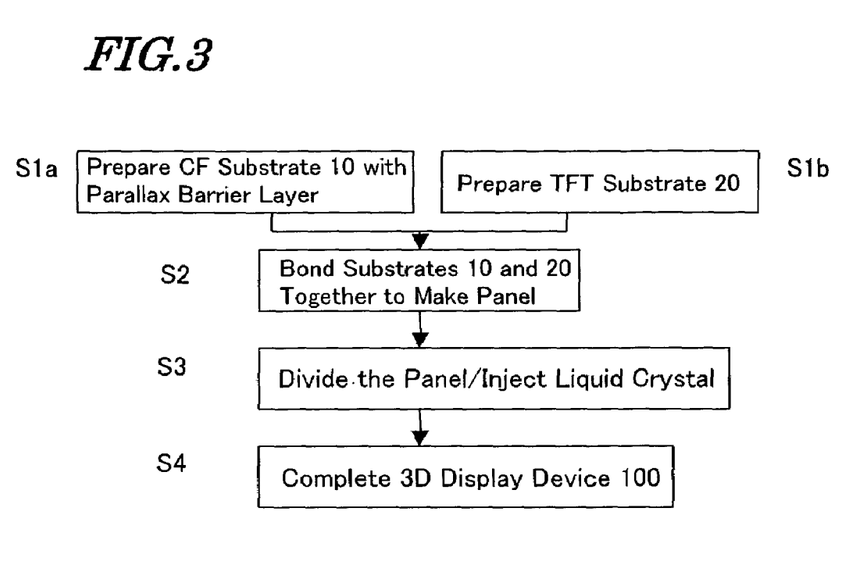
FIG. 3 is a flowchart showing the process of making a plurality of display devices out of a single large scale panel by using the counter substrate 10 with a parallax barrier layer according to the present invention.

Next, in Step S2, the large scale CF substrate 10 and the large scale TFT substrate 20 are bonded together and secured to each other with a predetermined gap provided between them, thereby obtaining a large scale panel. This bonding process step may be carried out by a known method using a seal agent.

Subsequently, in Step S3, the large scale panel may be divided into a number of smaller panels, a liquid crystal material may be injected into each of those panels and the assembly may be sealed, for example. In this case, the process steps of injecting the liquid crystal material and sealing the assembly may be performed first, and then the large scale panel may be divided.

Thereafter, in Step S4, a polarizer 40, a backside polarizer, a phase plate and so on may be bonded as needed to each of the resultant smaller panels, and then a driver circuit, a power supply circuit, a backlight and so on are further provided for each panel, thereby obtaining a three-dimensional display device 100.

In this case, if the parallax barrier layer 12 is made of a metallic material, then the parallax barrier layer 12 can be relatively thin (will have a thickness of 0.1 μm to 0.2 μm, for example). In that case, the translucent portions 12b will be filled with the adhesive layer for bonding the polarizer 40 to the parallax barrier layer 12. As a result, no air layer will be created between the parallax barrier layer 12 and the polarizer 40 and the loss of light due to reflection can be minimized. Naturally, the refractive index of the adhesive layer is preferably matched to that of the first substrate 11. It should be noted that depending on the display mode of the LCD, a phase plate (not shown) is further provide between the CF substrate 10 and the polarizer 40. In that case, the polarizer 40 described above may be replaced with the phase plate.

In the preferred embodiment described above, a process, in which a large scale panel is fabricated first and then the process steps of injecting a liquid crystal material and sealing the assembly, has been described as an example. Alternatively, a process in which the liquid crystal material is dripped onto either the substrate 10 or the substrate 20 and then the two substrates 10 and 20 are bonded together may be carried out instead.

As described above, according to the present invention, a process of fabricating a display panel by using a large scale CF substrate 10 that already includes a parallax barrier layer 12 can be adopted. Accordingly, in making forty display panels out of a single large scale panel, for example, the process step of aligning the parallax barrier substrate 53 with each of the separated display panels needs to be carried out forty times in total according to the conventional method. In contrast, according to the present invention, the alignment needs to be done just once. Naturally, there is no need to carry out the process step of bonding the parallax barrier substrate 53 itself.

Thus, according to the present invention, a three-dimensional display device, in which a parallax barrier layer is arranged with a higher positioning accuracy and which can display a 3D image of higher quality than a conventional one, an be manufactured with high productivity.

Furthermore, if there are multiple viewers, a display device that can present a number of different pictures to them can be fabricated by the manufacturing process described above. Such a display device can be fabricated by changing the arrangement pattern of the opaque portions 12a and translucent portions 12b shown in FIG. 2(b). That is to say, the opaque portions 12a and translucent portions 12b need to be arranged such that the light that has been transmitted through a particular pixel reaches at least two viewers who are separate from each other by a predetermined distance.

Various preferred embodiments of the present invention have been described as being applied to a liquid crystal display device. However, the present invention is also applicable for use in a display device including a display medium layer other than a liquid crystal layer (e.g., to an electrophoretic display device).

INDUSTRIAL APPLICABILITY

The present invention provides a display device, which can display a 3D image of higher quality than a conventional one, or present respectively different pictures to the viewpoints of multiple viewers, by arranging a parallax barrier layer with higher positioning accuracy, and a method for fabricating such a display device. The present invention also provides a substrate with a parallax barrier layer, which can be used effectively in such a display device, and a method for fabricating the substrate. The present invention can be used effectively in a high-definition display device of high display quality and a method for fabricating such a display device.

The invention claimed is:

1. A method for fabricating a substrate with a parallax barrier layer, the method comprising:
(a) preparing a first substrate, which has a first principal surface and a second principal surface that are opposed to each other and which is made of a transparent material;

(b) providing a parallax barrier layer with a predetermined pattern on the first principal surface of the first substrate;

(c) forming a first layer, which satisfies a prescribed positional relationship with the parallax barrier layer, on the second principal surface of the first substrate; and wherein the step (b) includes a step of making a first alignment mark, wherein the alignment mark is formed in the parallax barrier, and step (c) comprises using the alignment mark in the parallax barrier in forming the first layer.

2. The method of claim 1, wherein the step (c) includes a step of locating the first alignment mark through the first substrate and achieving alignment with respect to the first alignment mark.

3. The method of claim 1, wherein the first alignment mark is made of a material of the parallax barrier layer.

4. The method of claim 1, wherein the parallax barrier layer is made of a metallic material.

5. The method of claim 1, wherein the step (c) includes a step of forming a color filter layer as the first layer.

6. The method of claim 1, wherein the step (c) includes a step of forming a black matrix layer as the first layer.

7. A method for fabricating a display device, the method comprising steps of:

(A) preparing a substrate with a parallax barrier layer by the method of claim 1, (B) securing a second substrate to the substrate with the parallax barrier layer with a predetermined gap provided between the two substrates; and (C) forming a display medium layer between the substrate with the parallax barrier layer and the second substrate.

8. The method of claim 7, further comprising a step of (D) dividing a panel, in which the substrate with the parallax barrier layer and the second substrate are combined with each other, into a number of smaller panels after one of the steps (B) and (C).

9. The method of claim 7, wherein the display medium layer is a liquid crystal layer.

10. The method of claim 9, further comprising a step of arranging a polarizer on a viewer-side surface of the parallax barrier layer after the step (D).

* * * * *